H. R. LEES.
MACHINE FOR HARVESTING POTATOES.
APPLICATION FILED DEC. 31, 1906.

915,449.

Patented Mar. 16, 1909.
2 SHEETS—SHEET 1.

Attest:
Ewd L. Folsom
Edward N. Saxton

Inventor:
Harry R. Lees,
by Spear, Middleton, Donaldson & Spear
Atty's.

H. R. LEES.
MACHINE FOR HARVESTING POTATOES.
APPLICATION FILED DEC. 31, 1906.

915,449.

Patented Mar. 16, 1909.
2 SHEETS—SHEET 2.

Attest:
Ewd L. Folson
Edward N. Sarton

Inventor:
Harry R. Lees,
by Spear, Middleton, Donaldson & Spear
Attys.

UNITED STATES PATENT OFFICE.

HARRY ROBERT LEES, OF DAYLESFORD, VICTORIA, AUSTRALIA.

MACHINE FOR HARVESTING POTATOES.

No. 915,449.  Specification of Letters Patent.  Patented March 16, 1909.

Application filed December 31, 1906. Serial No. 350,237.

*To all whom it may concern:*

Be it known that I, HARRY ROBERT LEES, a subject of the King of Great Britain and Ireland, &c., residing at Daylesford, in the State of Victoria, Commonwealth of Australia, have invented certain new and useful Improvements in Machines for Harvesting Potatoes and the Like; and I do hereby declare the following to be a full, clear, and exact description of the invention, such as will enable others skilled in the art to which it appertains to make and use the same.

The object of this invention is to provide improvements in machines for harvesting potatoes, onions, and the like, that is digging, screening and delivering them—if desired sorting or grading, and bagging them.

The word potatoes used hereinafter for brevity will be understood not to limit thereto the scope of the invention. But no claim is made to any special bagging mechanism.

In carrying the invention into effect I provide a wheeled carriage of any suitable construction having frontal means for cutting away and pushing or moving to one side the tops of the plants. Behind these means I provide a plurality of forks mounted on a suitable revoluble body so arranged that as the machine is drawn or driven along each fork continues the making of a trench, each fork carrying upward earth containing potatoes, and dropping the same upon a fork cleaning chute to the rear, from which they are tipped or ejected into a transversely set revoluble drum, which contains a spiral conveyer, and has a perforated periphery, so that dirt will fall through the drum, the potatoes being carried rearward to a screen and cleaner thence up to an elevator, and lastly down along a chute and if desired sorter to means for bagging.

Other details also embracing novel features are used as will appear from what follows.

In the accompanying drawings each view shows parts of the machine, various parts being broken out or omitted, some for convenience in drawing, others to allow certain parts to be seen more clearly.

Figure 1:
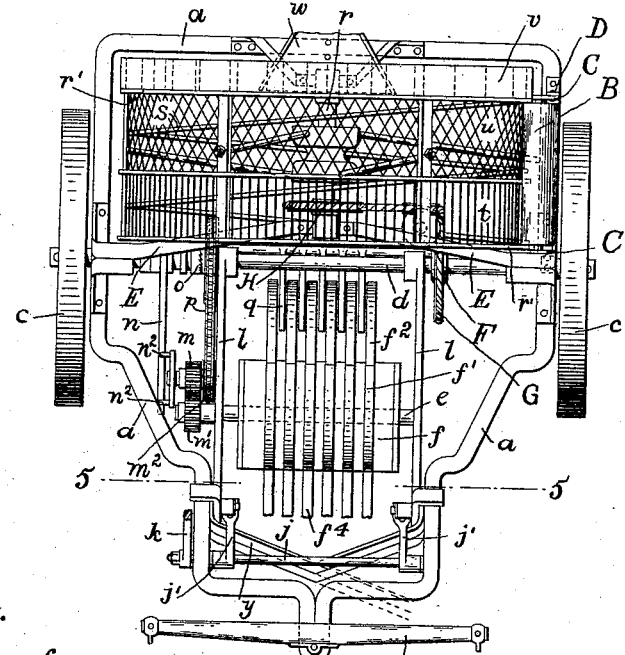
Figure 4:
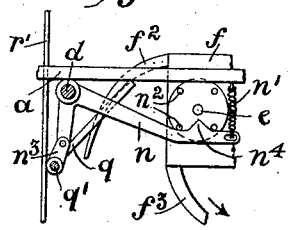
Figure 3:
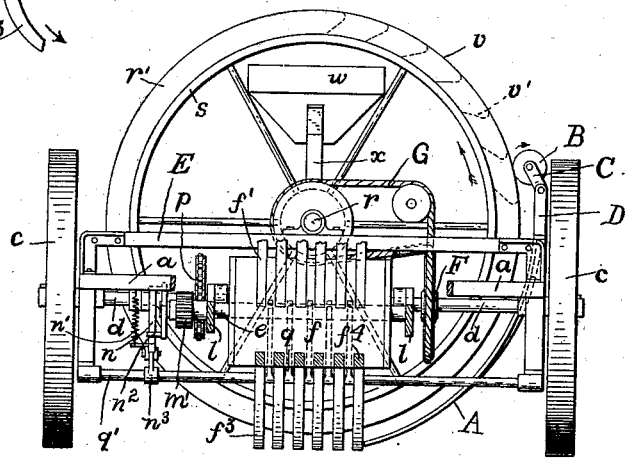
Figure 2:
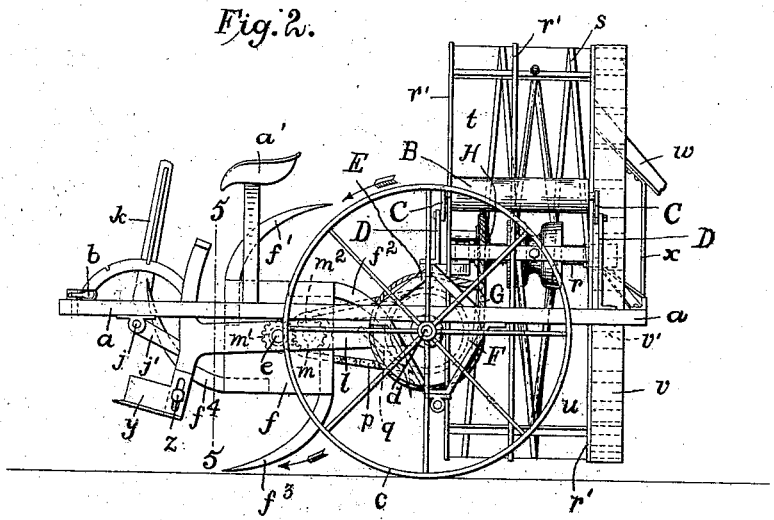
Figure 5:
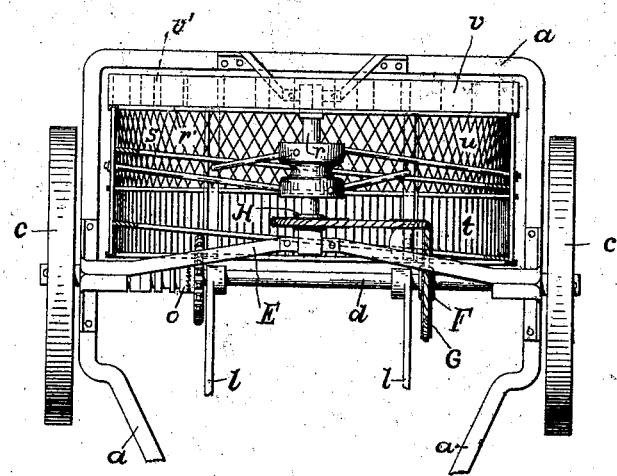

Figure 1 is a plan view; Fig. 2 a side elevation; and Fig. 3 a front elevation in section on line 5 Figs. 1, 2, looking rearward. Fig. 4 shows details. Fig. 5 is a plan view, partly in section, of a portion of the apparatus shown in Fig. 1. There may be added if desired a front wheel or wheels for steering or supporting purposes.

In these views the main frame of the machine is marked $a$, angle iron being largely applicable in its construction.

$b$ indicates means for the attachment of animal draft, but if desired motor driving may be substituted. Usually the driver will have a seat $a^1$, and use horses.

Other parts shown are lettered as below.

$c$—road or driving wheels on main axle—any suitable wheel studs or bars as facings to grip the ground firmly are at will provided. $d$—main axle. $e$—axle of a drum having bearings in an adjustable frame $l$. The whole machine is operated from this axle when the clutch below mentioned is in gear. $f$—a drum, shown as four sided, having fixed to it projecting curved forks $f^1, f^2, f^3, f^4$, one fork on each side, the direction of travel being forward and of revolution as shown by arrow in Fig. 2. $j$—a spindle to work in bearings on frame $a$ and to carry keyed or fixed to it an operating lever with handle $k$, also at each side a bell crank $j^1$ for the purpose of raising frames $l$ described below. $l$—framing at each side of drum $f$. These frames are bars pivoted to work freely on axle $d$. Each bar supports an end of the spindle of drum $f$, and a gear wheel $m^1$ on that spindle meshes with another $m$ having a spindle mounted on frame $l$. The drum $f$ can thus be raised or lowered at will, so as to allow the forks on it to dig or not as desired, and to regulate the depth of trench. $m^2$—a sprocket wheel united to wheel $m$, having chain $p$ passing over a sprocket wheel on axle $d$, so that the travel of the machine will drive the sprocket gear and thus rotate the fork drum $f$. When it is desired to allow the machine to travel without working the forks, the sprocket gear is thrown out of action by means of a clutch $o$, having any suitable operating handle or means not shown. The direction of motion of the forks, is by reason of the gearing used, the reverse of that of the axle $d$. $n$—means as a bell crank pivoted on axle $d$ and at one end having a spring $n^1$ for the purpose of returning it to its normal position. The bell crank is vibrated at intervals and so swings a fork or rake $q$ mentioned below. There are pins $n^2$ on a base or disk on the drum $f$. $n^3$ is a link pivoted to the bell crank and fast to spindle $q^1$ of the fork $q$. As each pin $n^2$ strikes in its revolution a projection $n^4$ on the part $n$, it causes the latter to swing on its pivot, the spring $n^1$ returning the said bell crank when the pin has passed. $q$—a transferring rake or fork adapted to swing so that its tines pass between those of each of the digging or trenching forks $f^1$ to $f^4$ in turn and effectually throw to the rear the potatoes and earth left on them. Fork $q$ oscillates through so short an arc that it has or may have always a rearward slope, so as to throw or allow to slide backward the said potatoes and earth. $r$—the axle of a screen, shown as a large cylinder $r^1$ (see Fig. 3) set transversely of the machine. This cylinder may be of greater length from front to rear than is illustrated. It is open at front and rear. $s$—a helical conveyer which forms a wall inside the periphery of the screen, and serves to convey or push potatoes gradually to the rear of the screen. $t$—the frontal portion of the revoluble screen $r^1$, formed by a series of distinct bars having between them longitudinal slots sufficiently wide to allow soil to fall through, but not so wide as to allow marketable potatoes to do so. By their friction these bars act as cleaners of the potatoes. $u$—the rear portion of the screen $r^1$ formed by wire netting or a grating having apertures sufficiently large to allow such potatoes to fall through as are too small to be required for marketing, and which do not escape by the slots of part $t$ of screen. $v$—an elevator or ring of pockets at the rear of and attached to screen $r^1$ to revolve with it. This ring or periphery is cylindrical and has inner partitions $v^1$ to form the series of pockets. The direction of revolution of screen $r^1$ and of the elevator $v$ is shown by an arrow in Fig. 3. The potatoes automatically fall over into the pockets, on reaching the screen rear edge. $w$—a chute extending away from beneath the upper part of the inner side of the elevator $v$ to any suitable point or points for delivery of potatoes to bags or any suitable receivers. The potatoes when raised sufficiently fall from the pockets upon the chute, and the chute has (or leads to when required) any suitable apertures to cause the potatoes to be graded before reaching the bags or other receptacles. This is not "claimed" below. $x$—framing or supporting means under chute $w$. $y$—a share or plant top removing device secured to frame $l$ and adapted to cut away and push to one side (or partly to one and partly to the other side) most or all of the "tops" of the plants, together with a shallow depth of the surface soil but sufficient to lessen the strain on the digging forks. The share is V shaped as in firm lines or may be oblique and straight as partly shown dotted. $z$—means as slot, screw bolt, and nut for regulating the height of the shares $y$ relatively to the ground.

When the digging forks are raised, so as not to trench, the share $y$ is simultaneously raised, since both are on framing $l$. When it is desired potatoes falling through the meshing or apertures $u$ may be retained by a receptacle attached below — not shown. Wire netting having its mesh of any other predetermined size is easily clamped on or substituted when the use of the mesh on the machine is undesirable. A—a soil and rubbish return chute—Fig. 3—consisting of a suitable plate or board under the screen at that side on which it will raise for some distance the earth and potatoes it is gradually conveying rearward. All the material that falls through the parts $t$, $u$, upon chute A returns to the trench made by the digging forks. B—a roller loose on its spindle or freely rotatable by friction and adapted to press on the outside of the bars $t$—or parts $t$ and $u$—so as to push inward and oblige to fall back into the screen those outwardly projecting potatoes which get gripped and lifted by two adjoining bars or the like. Instead of using a single roller there may be a series of shorter rollers. There will be continuous lifting action to one side as the screen revolves, but the material lifted falls back by gravity and this action cleans the potatoes. When the potatoes are eventually carried to the screen rear and fall over into the pockets they cannot tumble out of the pockets until they have been elevated to near the top of the ring of pockets. They then fall upon chute $w$ because that chute projects forward well beneath the top pockets. C—means for yieldingly holding or pressing roller B in position, as at each end of the roller an arm pivoted to the framing D which is bracketed to main frame $a$. D—supporting frame of arms C of roller B, E—framing extending across the machine to support the revoluble screen $r^1$. F—means as a driving pulley—Fig. 1, 2 and 3 with rope G to rotate the screen and pockets in the direction of the arrow shown in Fig. 3. The rope G is passed (as illustrated in Figs. 1 and 2) over a grooved pulley H which is fast to spindle $r$ of the screen. It is convenient to locate pulley H within the screen.

What I do claim as my invention and desire to secure by Letters Patent of the United States is:—

1. In a potato harvesting machine, the combination with a transverse revoluble screen open at front and rear of a rotatable external roller and means to press the same against the screen for the purpose set forth.

2. In a potato harvesting machine the combination with a helical conveyer screen adapted to raise potatoes and earth to one side and allow the same to fall back, of a chute under one side of the screen to return to the trench material which falls through the screen.

In witness whereof I have hereunto set my hand in the presence of two witnesses.

HARRY ROBERT LEES.

Witnesses:
   B. M. LOWE,
   A. M. HOLT.